March 31, 1931.   H. A. KUHN ET AL   1,798,164
IMPREGNATION OF FILTERS
Filed Oct. 28, 1926
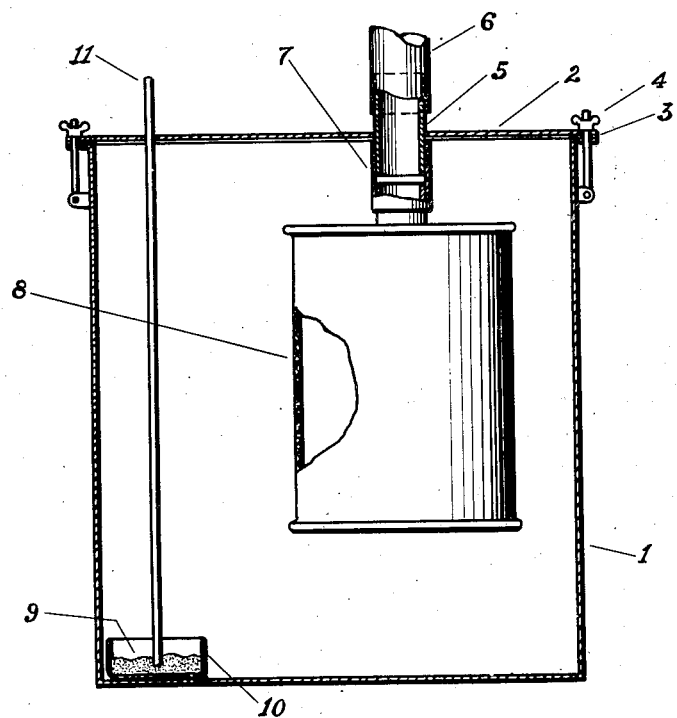
INVENTORS.
Harry A. Kuhn
and
BY   William A. Boyle
ATTORNEY.

UNITED STATES PATENT OFFICE

HARRY A. KUHN AND WILLIAM A. BOYLE, OF EDGEWOOD, MARYLAND; SAID BOYLE ASSIGNOR TO SAID KUHN

IMPREGNATION OF FILTERS

Application filed October 28, 1926. Serial No. 144,812.

(GRANTED UNDER THE ACT OF MARCH 3, 1883, AS AMENDED APRIL 30, 1928; 370 O. G. 757)

This invention described herein may be manufactured and used by or for the Government for Government purposes without the payment to us of any royalty thereon.

This invention relates in general to a process for increasing the efficiency of filters and more particularly has reference to a process for increasing the efficiency of foraminous filters commonly used to remove smokes and gases from the air.

Heretofore in the art filters of this character have not rendered the maximum efficiency. The filters used at the present time impede only the larger particles allowing the smaller ones to pass through the filter unhindered and necessarily lowering the efficiency of a filter to that extent.

An object of this invention is to provide a process for increasing the efficiency of foraminous filters by impregnating the pores with finely divided substance.

This invention consists in general of impregnating a foraminous filter with finely divided substance, the substance being adapted to render the operation of the filter more efficient without appreciably raising the resistance.

With these and other objects in view which may be incident to the improvements forming the subject matter of this invention, the invention consists in the process to be hereinafter set forth and claimed with the understanding that the several features and ingredients comprising the invention may be varied in construction, substance and proportion without departing from the spirit and scope of the appended claims.

It was observed in tests that the efficiency of a filter subjected to the passage of smoke was increased to a certain extent after continued operation. It was further noted, however, that the pressure drop was raised due to the plugging of the pores of the filter by the larger particles of the matter. Hence the inference was drawn that the larger particles gradually clogged in the pores of the filter rendering more efficient operation in that the pores diminishing in size offered an increasing ratio of interference, the interference, however, necessarily raising the pressure drop.

It followed therefore that if a substance was found which would clog the pores of filters only to the extent of excluding smoke particles, the resistance would not be appreciably raised and the efficiency of the filter would be greatly increased.

In experiment a number of filters which proved of low efficiency when subjected to ammonium chloride, as well as numerous other gases and smokes, were treated with both very finely pulverized dry activated charcoal and lamp black. In every instance the filters so treated gained from eight to fifteen per cent in efficiency. In case of the treatment with activated charcoal, an efficiency approaching one hundred per cent was obtained, while the pressure drop was raised only from one to two millimeters. Numerous other finely pulverized dry substances were also found to possess efficient impregnating properties in this process, such as hydrated lime and calcium and magnesium carbonates. These substances, however, gave a greater raise in the resistance than that obtaining in the activated charcoal treatment and were also affected to some extent by the moisture and gases in the atmosphere. Hence while it is manifest that many other substances may be substituted in this process, dry activated charcoal or lamp black are deemed to be the most efficient.

We have further found that the state of subdivision of the impregnating material is highly important; preferably it should be ground to such fineness as to at least pass through a one hundred mesh sieve.

It is manifest that numerous apparatus may be devised to effectuate our process. In the accompanying drawing we have shown one which while simple in structure has proved efficacious in carrying out our method of impregnation.

In the drawings, in the single figure is shown a container 1 of any desired shape, size and construction. This container is fitted with an apertured cover 2. Interposed between the top flange on the container and the cover plate is a gasket 3 of rubber or any similar suitable material. Pivotally supported in lugs attached to the container are a plurality of threaded securing bolts. These bolts are adapted to protrude through aligned slots in the cover 2 and to receive the thumb nuts 4.

A short section of tubing 5 is soldered or otherwise suitably secured to the lid 2. Fitting over the upper end of the tube section 5 is a conduit 6 which is connected at its other end to a suction pump (not shown). To the end of the tube 5 which projects into the interior of the container is tightly fitted a short tubular member 7. As clearly shown in the drawings, the lower portion of this tube 7 is adapted to receive a short pipe section on the canister 8, which contains the material to be impregnated. It is to be understood that the connections between the tubes 5, 6 and 7 and the pipe section of the container are airtight.

Conveniently placed within the impregnating chamber 1 is a receptacle 10. This is shown as filled with finely divided impregnating material 9. An intake pipe 11 projecting through the lid 2 terminates well below the surface of the material 9. It is to be noted that the bore of the pipe 11 is very small with respect to the bore of the suction tube 6.

When it is desired to impregnate a filter, the canister containing the filtering material is fitted to the tube 7, as shown in the drawings. The receptacle 10 is then filled with impregnating material and the cover 2 placed on the supporting flanges of the chamber. In this position the lower end of the intake tube 11 extends into the impregnating material. The cover is then secured to the body by screwing down on the nuts 4. Due to the interposed gasket this joint between the container and cover is air tight. The suction pump is then operated to withdraw air from the container. The suction set up in the line 6 causes air to be drawn through the tube 11, the upper end of which is open to the atmosphere. Due to the relatively small bore of the tube 11, this incoming air enters at a high velocity and causes the powdered impregnating material to be carried up to the canister as a dust current. As this material is drawn into the canister due to the suction in the filter line 6, the particles are deposited evenly on the surface of the filter material.

By this method after a short period of treatment a thin uniform coating of the charcoal, lamp black or other substance employed will cover the surface of the filter, the excess of which may be removed in any suitable manner.

While there is shown and described the preferred embodiment of this invention, it will be understood that it is not confined to the particular details herein set forth by way of illustration, as it is apparent that many changes and variations may be made therein by those skilled in the art without departing from the spirit of the invention or exceeding the scope of the appended claims.

We claim:

1. A process for producing a filter for gas and smoke masks comprising impregnating a foraminous cellulose tissue with a discrete carbon product.

2. A process for producing a filter for gas and smoke masks comprising impregnating a foraminous cellulose material with activated charcoal in a discrete condition.

3. As a new article, a filter comprising an interstitial cellular body, incorporated therein an impregnant comprising a dry, discrete, pulverized carbon.

In testimony whereof we affix our signatures.

HARRY A. KUHN.
WILLIAM A. BOYLE.